United States Patent
Kastiel (10) Patent No.: US 12,515,789 B2
(45) Date of Patent: Jan. 6, 2026

(54) DUAL COLLECTIVE ROTOR HEADS

(71) Applicant: EFIX AVIATION LTD, Kadima (IL)

(72) Inventor: Efraim Kastiel, Tel Aviv (IL)

(73) Assignee: EFIX AVIATION LTD, Kadima (IL)

( * ) Notice: Subject to any disclaimer, the term of this patent is extended or adjusted under 35 U.S.C. 154(b) by 0 days.

(21) Appl. No.: 18/848,899

(22) PCT Filed: Apr. 4, 2023

(86) PCT No.: PCT/IL2023/050360
§ 371 (c)(1),
(2) Date: Sep. 19, 2024

(87) PCT Pub. No.: WO2023/203558
PCT Pub. Date: Oct. 26, 2023

(65) Prior Publication Data
US 2025/0197001 A1 Jun. 19, 2025

(30) Foreign Application Priority Data

Apr. 17, 2022 (IL) .......................................... 292325

(51) Int. Cl.
*B64C 27/605* (2006.01)
*B64C 27/57* (2006.01)
(52) U.S. Cl.
CPC ............ *B64C 27/605* (2013.01); *B64C 27/57* (2013.01)

(58) Field of Classification Search
None
See application file for complete search history.

(56) References Cited

U.S. PATENT DOCUMENTS

| 2,994,386 | A | 8/1961 | Enstrom |
| 7,585,153 | B1 | 9/2009 | Schmaling et al. |
| 8,235,324 | B1 * | 8/2012 | Birch ...................... B64C 27/68 |
| | | | 244/17.25 |
| 9,038,940 | B1 | 5/2015 | van der Westhuizen |
| 11,952,108 | B2 * | 4/2024 | Rey ........................ B64C 13/503 |
| 11,952,111 | B2 * | 4/2024 | Stamps ............... B64C 29/0033 |
| 2021/0163128 | A1 * | 6/2021 | Stamps ................. B64C 27/605 |
| 2022/0033066 | A1 * | 2/2022 | Rey ........................ B64C 13/503 |

FOREIGN PATENT DOCUMENTS

EP 1655221 B1 7/2008

OTHER PUBLICATIONS

Arnold—EP 1655221 B1 + machine translation (Year: 2008).*

(Continued)

*Primary Examiner* — Juan G Flores
(74) *Attorney, Agent, or Firm* — Panitch Schwarze Belisario & Nadel LLP (57) ABSTRACT

A dual collective rotor head including a swashplate mechanism for cyclic control and collective control of its rotor blades, a servo arrangement for actuating the swashplate mechanism and an additional dedicated collective control servo for collective control of its rotor blades independent of the servo arrangement.

11 Claims, 12 Drawing Sheets

(56) References Cited

OTHER PUBLICATIONS

Boskovic et al., "Failure Detection, Identification and Reconfiguration in Flight Control," Fault Diagnosis and Fault Tolerance for Mechatronic Systems, Recent Advances Series: Springer Tracts in Advanced Robotics, vol. 1, F. Caccavale and L. Villani (Eds), Chapter 5, Springer Verlag, NY, pp. 1-34 (2002).
Edwards et al., "Fault Tolerant Flight Control—A Survey," LNCIS, Chapter 2, vol. 399, pp. 47-89 (2010).
International Search Report issued Jun. 28, 2023 in International Application No. PCT/IL2023/050360.
U.S. Department of Transportation, Federal Aviation Administration, Order 2020.26C, "Aircraft Certification Service Flight Test Risk Management," pp. 1-44 (Oct. 5, 2021).
Wang et al., "Helicopter Safe Landing Trajectory after Main Rotor Actuator Failures," Applied Sciences, vol. 10, No. 2917, pp. 1-12 (2020).
Written Opinion issued Jun. 28, 2023, in International Application No. PCT/IL2023/050360.

* cited by examiner

SCENARIO: SERVO 2 LOCK-IN-PLACE SERVO FAILURE

| INPUT COMMANDS | SERVO COMMANDS | | | SERVO RESPONSES | | | FLIGHT CONSEQUENCE | FAILURE SEVERITY |
|---|---|---|---|---|---|---|---|---|
| | SERVO 1 | SERVO 2 | SERVO 3 | SERVO 1 | SERVO 2 | SERVO 3 | | |
| ROLL RIGHT | + | − | = | + | = | = | REDUCED ROLL RIGHT + UNDESIRED PITCH UP + UNDESIRED COLLECTIVE UP | SINGLE ROTOR– CATASTROPHIC FAILURE |
| ROLL LEFT | − | + | = | − | = | = | REDUCED ROLL LEFT + UNDESIRED PITCH DOWN + UNDESIRED COLLECTIVE DOWN | |
| PITCH UP | + | + | − − | + | = | − − | REDUCED PITCH UP + UNDESIRED ROLL RIGHT + UNDESIRED COLLECTIVE DOWN | |
| PITCH DOWN | − | − | + + | − | = | + + | REDUCED PITCH DOWN + UNDESIRED ROLL LEFT + UNDESIRED COLLECTIVE UP | |
| COLLECTIVE UP | + + | + + | + + | + + | = | + + | UNDESIRED PITCH DOWN + UNDESIRED ROLL RIGHT + UNDESIRED COLLECTIVE DOWN | MULTI ROTOR– HAZARDOUS FAILURE |
| COLLECTIVE DOWN | − − | − − | − − | − − | = | − − | UNDESIRED PITCH UP + UNDESIRED ROLL LEFT + UNDESIRED COLLECTIVE UP | |

LEGEND
+ UP MOVEMENT
− DOWN MOVEMENT
= NO MOVEMENT

FIG. 4
(PRIOR ART)

SCENARIO: SERVO 2 HARD-OVER SERVO FAILURE

| INPUT COMMANDS | SERVO COMMANDS | | | SERVO RESPONSES | | | FLIGHT CONSEQUENCE | FAILURE SEVERITY |
| --- | --- | --- | --- | --- | --- | --- | --- | --- |
| | SERVO 1 | SERVO 2 | SERVO 3 | SERVO 1 | SERVO 2 | SERVO 3 | | |
| ROLL RIGHT | + | − | = | + | +++++ | = | UNDESIRED ROLL LEFT + UNDESIRED PITCH UP + UNDESIRED COLLECTIVE UP | |
| ROLL LEFT | − | + | = | − | +++++ | = | EXTREME ROLL LEFT + UNDESIRED PITCH UP + UNDESIRED COLLECTIVE UP | SINGLE ROTOR-CATASTROPHIC FAILURE |
| PITCH UP | + | + | −− | + | +++++ | −− | EXTREME PITCH UP + UNDESIRED ROLL LEFT + UNDESIRED COLLECTIVE UP | |
| PITCH DOWN | − | − | ++ | − | +++++ | ++ | UNDESIRED PITCH UP + UNDESIRED ROLL LEFT + UNDESIRED COLLECTIVE UP | MULTI ROTOR-CATASTROPHIC FAILURE |
| COLLECTIVE UP | ++ | ++ | ++ | ++ | +++++ | ++ | UNDESIRED PITCH UP + UNDESIRED ROLL LEFT + UNDESIRED COLLECTIVE UP | |
| COLLECTIVE DOWN | −− | −− | −− | −− | +++++ | −− | UNDESIRED PITCH UP + UNDESIRED ROLL LEFT + UNDESIRED COLLECTIVE UP | |

LEGEND
+ UP MOVEMENT
− DOWN MOVEMENT
= NO MOVEMENT

| | SCENARIO: SERVO 2 LOCK-IN-PLACE SERVO FAILURE |||||||||
|---|---|---|---|---|---|---|---|---|---|
| | SERVO COMMANDS |||| SERVO RESPONSES |||| FLIGHT CONSEQUENCE | FAILURE SEVERITY |
| INPUT COMMANDS | SERVO 1 | SERVO 2 | SERVO 3 | SERVO 4 | SERVO 1 | SERVO 2 | SERVO 3 | SERVO 4 | | |
| ROLL RIGHT | + | − | = | = | ++ | = | + | − | NORMAL OPERATION (CYCLIC AND COLLECTIVE CONTROL ARE OPERATIVE) | SINGLE ROTOR– MINOR FAILURE |
| ROLL LEFT | − | + | = | = | −− | = | − | + | | |
| PITCH UP | + | + | −− | = | = | = | −−−− | ++ | | |
| PITCH DOWN | − | − | ++ | = | = | = | ++++ | −− | | MULTI ROTOR– NO SAFETY EFFECT |
| COLLECTIVE UP | + | + | + | + | = | = | = | ++++ | | |
| COLLECTIVE DOWN | − | − | − | − | = | = | = | −−−− | | |

LEGEND
+ UP MOVEMENT
− DOWN MOVEMENT
= NO MOVEMENT

FIG. 15

SCENARIO: SERVO 2 HARD-OVER SERVO FAILURE

| INPUT COMMANDS | SERVO COMMANDS | | | | SERVO RESPONSES | | | | FLIGHT CONSEQUENCE | FAILURE SEVERITY |
|---|---|---|---|---|---|---|---|---|---|---|
| | SERVO 1 | SERVO 2 | SERVO 3 | SERVO 4 | SERVO 1 | SERVO 2 | SERVO 3 | SERVO 4 | | |
| ROLL RIGHT | + | − | = | = | ++++++ | ++++++ | ++++++ | ------ | | |
| ROLL LEFT | − | + | = | = | ++++++ | ++++++ | ++++++ | ------ | CAN LEVEL THE SWASHPLATE IN MID-HIGH COLLECTIVE POINT | SINGLE ROTOR− CATASTROPHIC FAILURE |
| PITCH UP | + | + | −− | = | ++++++ | ++++++ | ++++++ | ------ | | |
| PITCH DOWN | − | − | ++ | = | ++++++ | ++++++ | ++++++ | ------ | NO CYCLIC CONTROL | MULTI ROTOR− MAJOR FAILURE |
| COLLECTIVE UP | + | + | + | + | ++++++ | ++++++ | ++++++ | ++++++ | | |
| COLLECTIVE DOWN | − | − | − | − | ++++++ | ++++++ | ++++++ | ++++++ | | |

LEGEND
+ UP MOVEMENT
− DOWN MOVEMENT
= NO MOVEMENT

FIG. 16

DUAL COLLECTIVE ROTOR HEADS

CROSS-REFERENCE TO RELATED APPLICATIONS

This application is a Section 371 of International Application No PCT/IL2023/050360, filed Apr. 4, 2023, which was published in the English language on Oct. 26, 2023, under International Publication No. WO 2023/203558 A1, which claims priority under 35 U.S.C. § 119 (b) to Israel Application No. 292325, filed Apr. 17, 2022, the disclosures of each of which are incorporated herein by reference.

FIELD OF THE INVENTION

This invention relates to rotorcraft in general and rotor heads in particular.

BACKGROUND OF THE INVENTION

Rotor heads include a swashplate mechanism rotatably mounted on a mast and a servo arrangement for actuating the swashplate mechanism.

Some conventional rotor heads include a mast, a swashplate mechanism displaceable along the mast and a stationary servo arrangement for actuating the swashplate mechanism for cyclic control and collective control of its rotor blades. The servo arrangement includes at least three servos. The mast can be either a solid mast or a hollow mast for reducing weight.

Other conventional rotor heads, for example, as disclosed in U.S. Pat. No. 2,994,386 to Enstrom entitled Control Mechanism, include a hollow mast, a stationary swashplate mechanism mounted at a fixed position along the hollow mast, a stationary servo arrangement for actuating the swashplate mechanism for cyclic control of its rotor blades only, and a stationary dedicated collective control servo for collective control of its rotor blades through the hollow mast. The servo arrangement includes at least two servos.

Servos can fail to correctly respond to an input command in a wide range of failures including inter alia a "lock-in-place" failure and "hard-over" failure. The Federal Aviation Administration (FAA) has issued FAA order 3030.26C classifying failure severities as follows:
- No Safety Effect—There is no impact on safety. No worse than normal operations.
- Minor—There is no significant effect on the aircraft or aircrew safety, but does slightly increase aircrew workload and/or decrease safety.
- Major—There is a significant reduction in safety margins; slight injuries to aircrew or minor damage to aircraft.
- Hazardous—There is a large reduction in safety margins; serious injury to aircrew or significant damage to aircraft.
- Catastrophic—There is loss of aircrew life or loss of aircraft. https://www.faa.gov/documentLibrary/media/Order/4040.26C.pdf For helicopters, a lock-in-place failure and a hard-over failure are typically considered as catastrophic failures. For multi-rotor rotorcraft, a single servo's lock-in-place failure are typically considered as a hazardous failure and a single servo's hard-over failure is classified as a catastrophic failure.

Fault Tolerant Flight Control Systems (FTFCSs) have been developed to at least partially mitigate some rotor head servo failures. FTFCSs employ technologies including inter alia Fault Detection, Isolation and Recovery (FDIR), adaptive-control algorithms, neural networks, and the like. Exemplary references include inter alia Helicopter Safe Landing Trajectory after Main Motor Actuator Failures by Yunjie Wang et al, Applied Science 2020, 10, 2917: doi: 10.3390/app 10082917, Fault Tolerant Flight Control by Edwards et al., LNCIS 399, pp 47-89. ISBN: 978-3-642-11689-6, and the like.

There is a need to further mitigate some rotor head servo failures.

SUMMARY OF THE INVENTION

The present invention is directed towards provisioning collective control of a rotor head's at least two rotor blades independent of its servo arrangement for actuating its swashplate mechanism for cyclic control and collective control of its rotor blades.

One aspect of the present invention is a so-called dual collective rotor head including a swashplate mechanism for cyclic control and collective control of its rotor blades, a servo arrangement for actuating the swashplate mechanism and an additional dedicated collective control servo for collective control of its rotor blades independent of the servo arrangement. The present invention envisages two preferred embodiments of the so-called dual collective rotor heads as follows: First, a dual collective rotor head including a hollow mast wherein the dedicated collective control servo controls the collective control of its rotor blades through the hollow mast independent of its servo arrangement. And second, a dual collective rotor head wherein its dedicated collective control servo displaces its servo arrangement along its mast for collective control of its rotor blades independent of its servo arrangement. The servo arrangement is preferably mounted on a platform and the dedicated collective control servo displaces the platform along the mast. In both embodiments, their dedicated collective control servos are preferably stationary.

Another aspect of the present invention is a Flight Control System (FCS) for controlling a dual collective rotor head's servo arrangement for cyclic control and collective control of its rotor blades and its dedicated collective control servo for collective control of its rotor blades. A FCS is pre-set for dividing collective control of a dual collective rotor head between its servo arrangement and its dedicated collective control servo in an absence of a servo failure in its servo arrangement and its dedicated collective control servo at a predetermined ratio. A FCS is typically pre-set for more or less equally dividing its collective control between its servo arrangement for actuating its swashplate mechanism and its dedicated collective control servo.

Assuming a servo arrangement and a dedicated collective control servo are both fully operative, then two extreme divisions of collective control therebetween are as follows:

First, the FCS employs the servo arrangement only and does not employ the dedicated collective control servo hereinafter referred to as a 100% servo arrangement/0% dedicated collective control servo ratio. In the case of a 100% servo arrangement/0% dedicated collective control servo ratio, a dedicated collective control servo is effectively in standby mode and only utilized for collective control on an occurrence of a servo failure in a servo arrangement.

And second, the FCS does not employ the servo arrangement and employs the dedicated collective control servo only hereinafter referred to as a 0% servo arrangement/100% dedicated collective control servo ratio. In the case of a 0% servo arrangement/100% dedicated collective control servo ratio, a servo arrangement is utilized for cyclic control only during standard operation and is only additionally utilized for collective control on an occurrence of a dedicated collective control servo failure.

A further aspect of the present invention is a computer readable storage medium comprising instructions for execution in a flight control system in a rotorcraft including at least one dual collective rotor head.

Yet a further aspect of the present invention is a rotorcraft including at least one rotor system having a dual collective rotor head. A dual collective rotor head can be equally deployed in new rotorcraft and retro-fitted to existing rotorcraft. The present invention can be equally deployed in single rotor rotorcraft, namely, helicopters, and multi-rotor rotorcraft, for example, quadcopters, hexacopters, octocopters, and the like.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF THE DRAWINGS

The present description is divided into three sections as follows:
Section 1: Conventional rotorcraft and conventional rotor heads
Section 2: Dual Collective Rotor Heads (DCRHs)
Section 3: Dual collective rotor head operation and failure workaround Section 1: Conventional Rotorcraft and Conventional Rotor Heads With reference to FIG. 1 to FIG. 7, a rotorcraft 10 includes a fuselage (not shown) and a Flight Control System (FCS) 11 for controlling one or more rotor systems 12 according to an input maneuver for controlling rotorcraft movement. For illustrative purposes, a rotor system 12 is shown having two rotor blades but the present invention can be equally implemented on rotor systems having more than two rotor blades. The FCS 11 includes control loops 13 and an actuating mixer 14 for commanding cyclic control and collective control of the rotor system(s) 12. In the case of a multi-rotor rotorcraft, the FCS 12 can issue the same or different cyclic commands and collective commands to its rotor systems 12 depending on the number of rotor systems 12 and an input maneuver. The control loops 13 receives input from sensors 16 for providing input to the actuating mixer 14.

Figure 1:
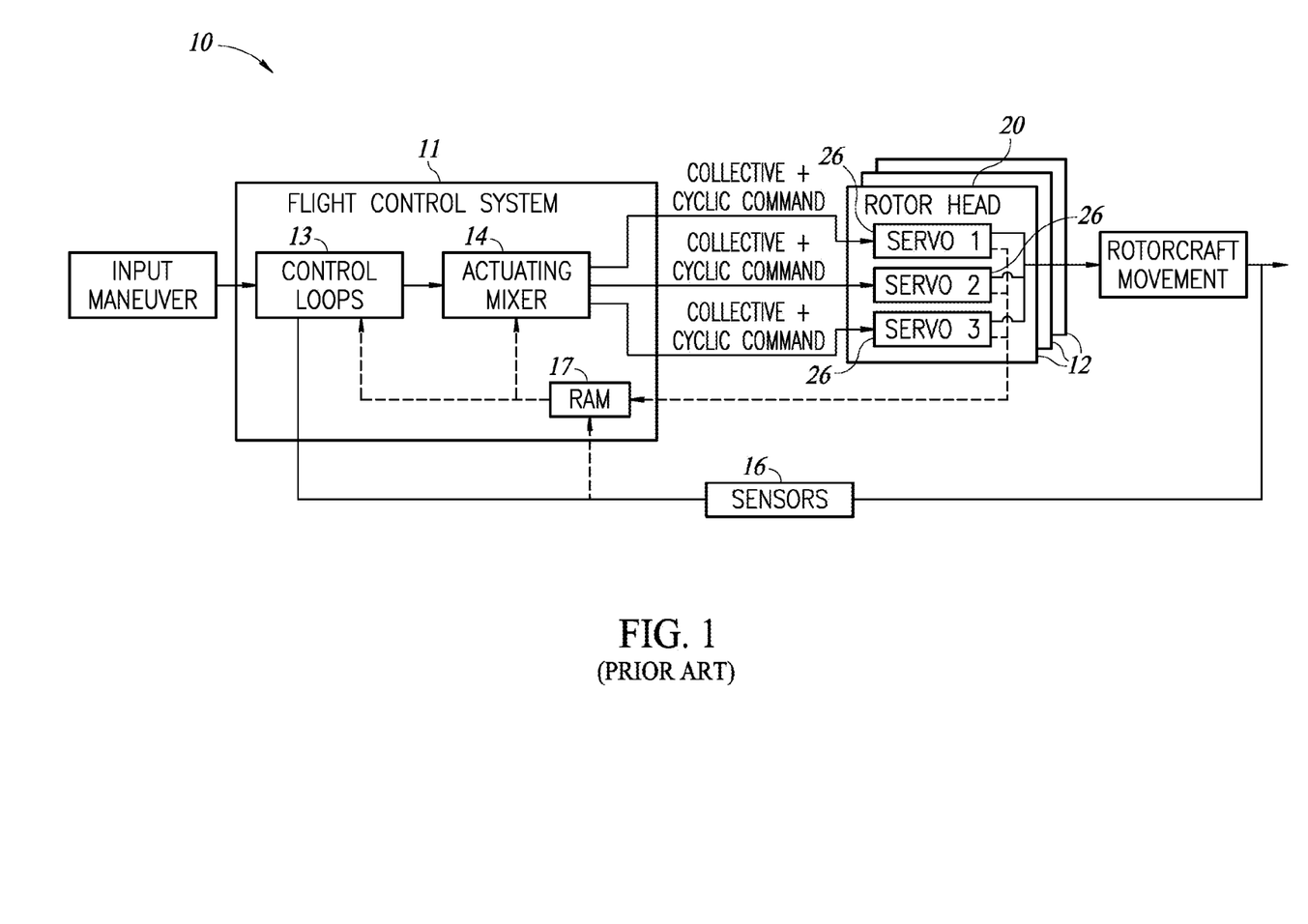
FIG. 1 is a block diagram of a conventional rotorcraft including multiple rotor systems each having a rotor head with a swashplate mechanism for cyclic control and collective control of its rotor blades.

Depending on a rotorcraft's complexity, a FCS 11 can be constituted as a Fault Tolerant Flight Control System (FTFCS) that includes a Reconfiguration and Adaptation Module (RAM) 17 employing the above described technologies including inter alia Fault Detection, Isolation and Recovery (FDIR), adaptive-control algorithms, neural networks, and the like. In this case, the RAM 17 may also receive input signals from the sensors 16 and servos 26 for issuing output signals to the control loops 13 and the actuating mixer 14.

Figure 2:
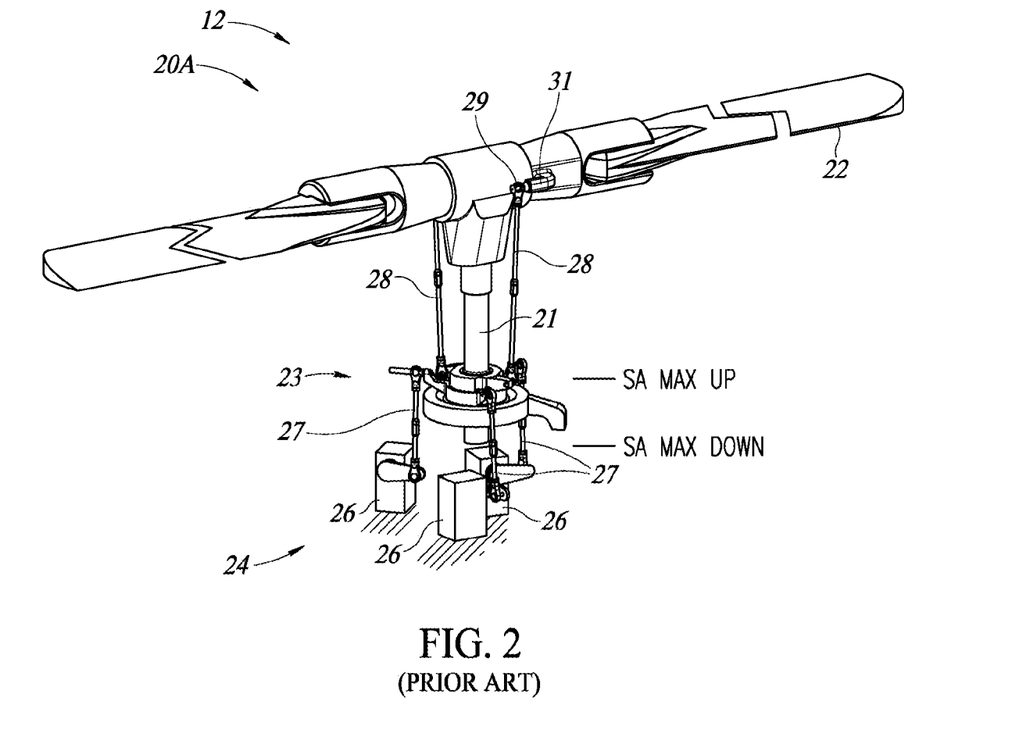
FIG. 2 is a pictorial view of a conventional rotor head having a swashplate mechanism for cyclic control and collective control of their rotor blades.
Figure 3:
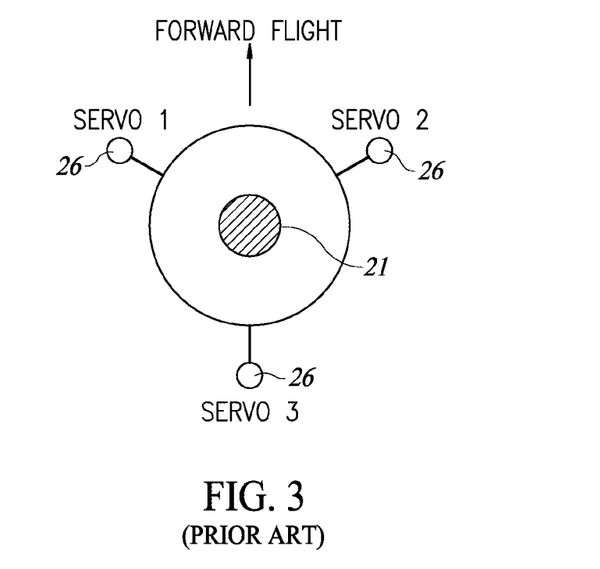
FIG. 3 is a schematic representation of the FIG. 2 rotor head.

With reference to FIG. 2 and FIG. 3, each rotor system 12 includes a rotor head 20A having a mast 21 configured for attachment of two rotor blades 22, and a motor (not shown) for driving the mast 21. The mast 21 can be solid (see FIG. 3) or hollow to reduce its weight.

The rotor head 20A includes a swashplate mechanism 23 for cyclic control and collective control of the rotor blades 22. The swashplate mechanism 23 is rotatably mounted on the mast 21 and displaceable therealong. The rotor head 20A includes a stationary servo arrangement 24 having three equispaced servos 26 denoted Servo 1, Servo 2 and Servo 3 including control rods 27 for actuating the swashplate mechanism 23 between a Servo Arrangement (SA) MAX UP position for maximum collective and a Servo Arrangement (SA) MAX DOWN position for minimum collective. The swashplate mechanism 23 includes a pair of upwardly extending push rods 28 terminating in a pair of ball joints 29 for rotatably receiving a pair of horns 31 rigidly connected to their corresponding rotor blades 22. The push rods 28 can be accommodated in a suitably shaped and dimensioned hollow mast 21.

Figure 4:
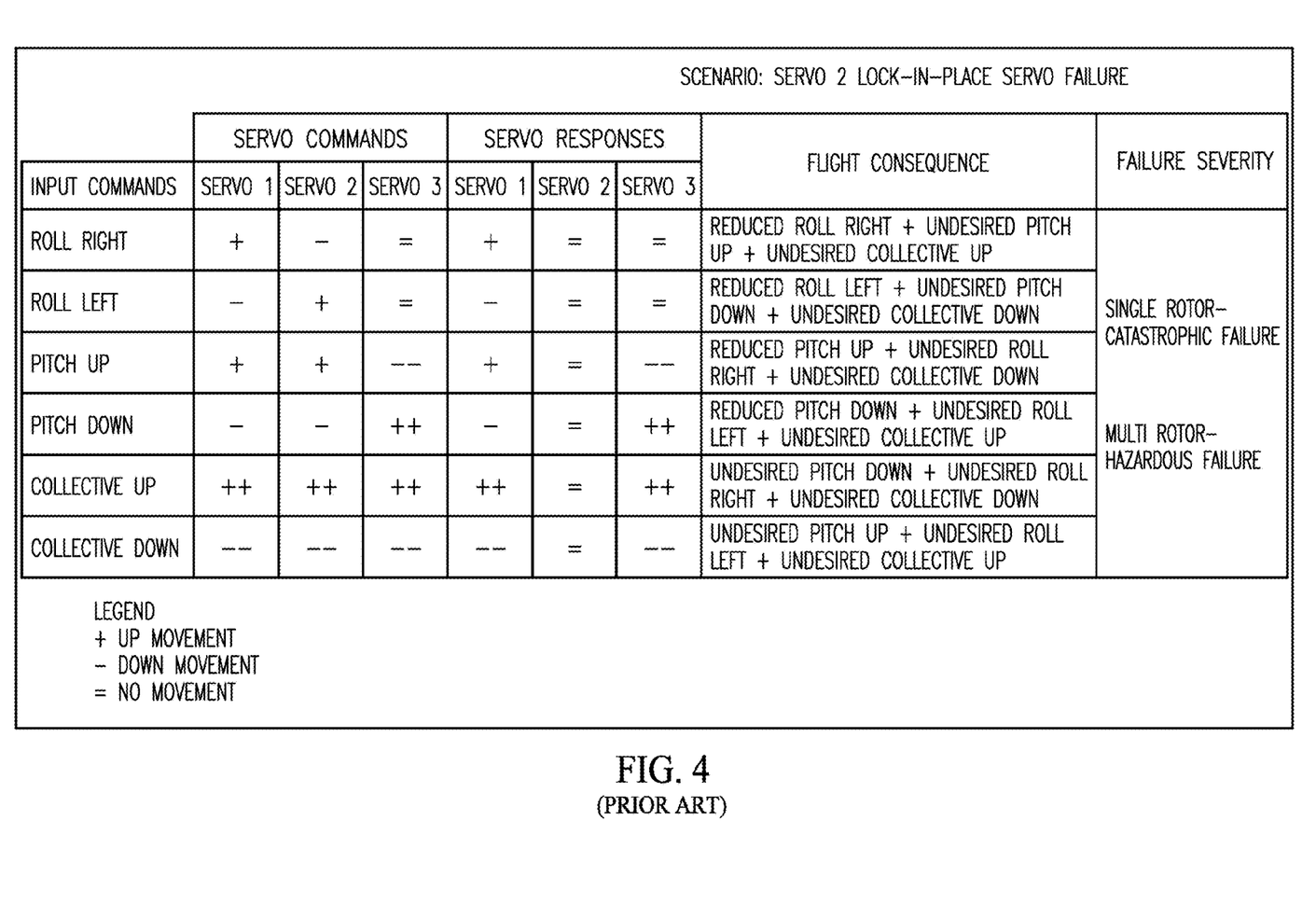
FIG. 4 is a table showing standard operation of the FIG. 2 rotor head and the flight consequences of an occurrence of a Servo 2 "lock-in-place" servo failure.

FIG. 4 shows servo commands for cyclic control and collective control of a rotor head 20A's rotor blades 22 for six input commands: Roll right, Roll Left, Pitch Up, Pitch Down, Collective Up and Collective Down and the servo responses on an occurrence of a Servo 2 "lock-in-place" servo failure. FIG. 4 additionally shows flight consequences and failure severity of a Servo 2 "lock-in-place" servo failure for two rotorcraft types: a single rotor helicopter and a multi-rotor rotorcraft, for example, a quadcopter. In the former, a Servo 2 "lock-in-place" servo failure is regarded as a catastrophic failure. In the latter, a Servo 2 "lock-in-place" servo failure is regarded as a hazardous failure.

Figure 5:
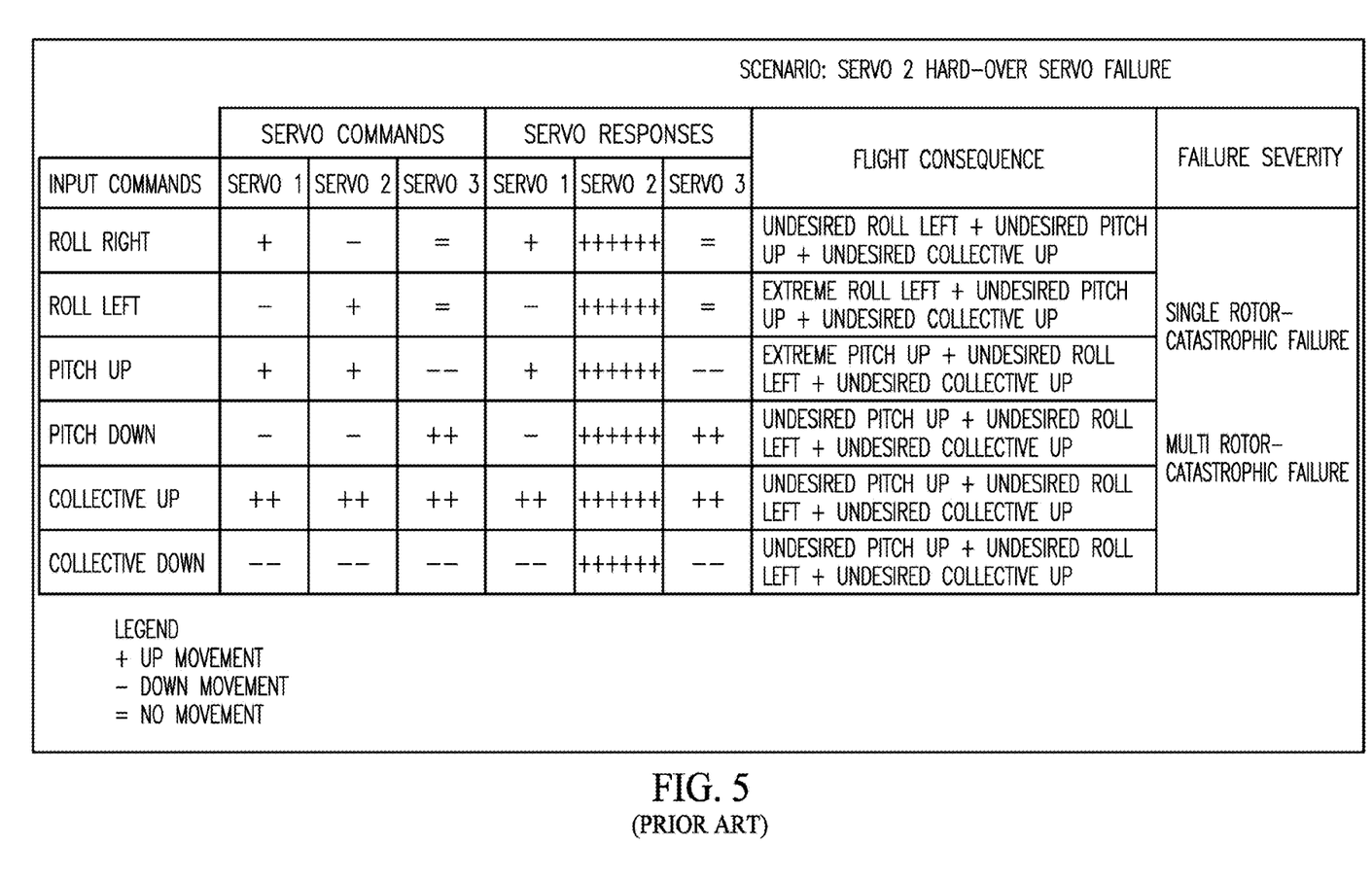
FIG. 5 is a table showing standard operation of the FIG. 2 rotor head and the flight consequences of an occurrence of a Servo 2 "hard-over" servo failure.

FIG. 5 shows servo commands for cyclic control and collective control of a rotor head 20A's rotor blades 22 for six input commands: Roll right, Roll Left, Pitch Up, Pitch Down, Collective Up and Collective Down and the servo responses on an occurrence of a Servo 2 "hard-over" servo failure. FIG. 5 additionally shows flight consequences and failure severity for two rotorcraft types: a single rotor helicopter and a multi-rotor rotorcraft, for example, a quadcopter. Both in the former and the latter, a Servo 2 "hard-over" servo failure is regarded as a catastrophic failure.

Figure 6:
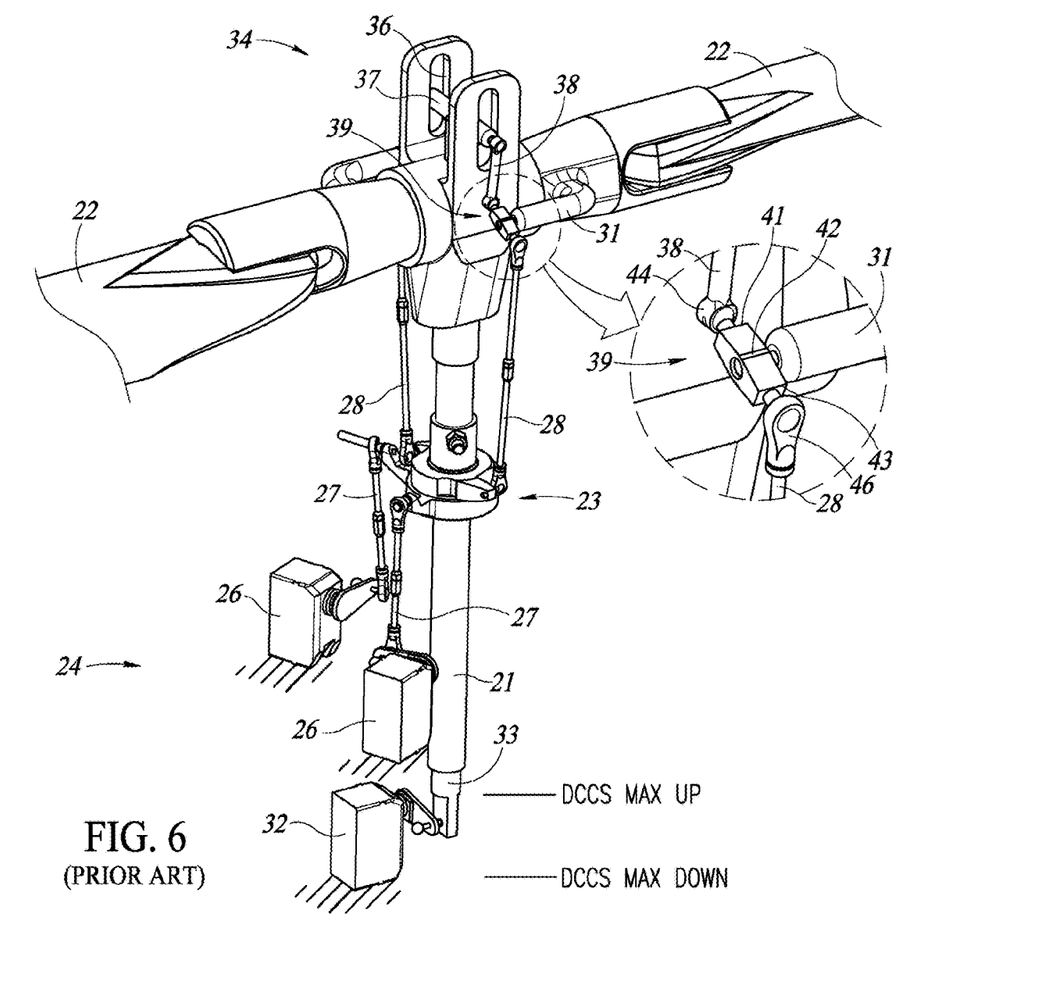
FIG. 6 is a pictorial view of another conventional rotor head having a swashplate mechanism for cyclic control of its rotor blades only and a dedicated collective control servo for collective control of its rotor blades only.
Figure 7:
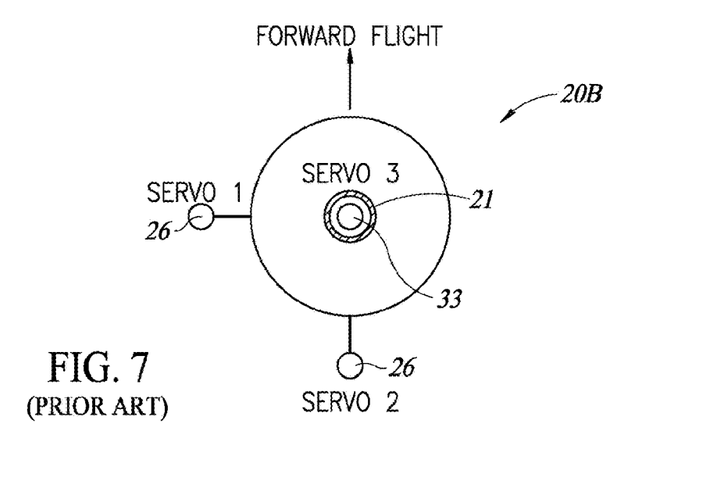
FIG. 7 is a schematic representation of the FIG. 6 rotor head.

FIG. 6 and FIG. 7 show a rotor head 20B having a similar construction as the rotor head 20A and therefore similar parts are likewise numbered. The rotor head 20B differs from the rotor head 20A insofar as the rotor head 20B's collective control of its rotor blades 22 is separated from their cyclic control as follows: The rotor head 20B includes a hollow mast 21 and a swashplate mechanism 23 stationary mounted therealong. The rotor head 20B includes a stationary servo arrangement 24 including a pair of servos 26 denoted Servo 1 and Servo 2 deployed at a right angle therebetween and a pair of control rods 27 for actuating the swashplate mechanism 23 for cyclic control of the rotor blades 22 only. The swashplate mechanism 23 includes a pair of upwardly extending push rods 28. The rotor head 20B includes a stationary dedicated collective control servo 32 denoted Servo 3 with a control rod 33 upwardly extending through the hollow mast 21 for collective control of the rotor blades 22 only. The dedicated collective control servo 32 denoted Servo 3 has a Dedicated Collective Control Servo (DCCS) MAX UP position for maximum collective and a Dedicated Collective Control Servo (DCCS) MAX DOWN position for minimum collective.

The rotor head 20B includes a bifurcated masthead 34 with a pair of spaced apart slots 36. The rotor head 20B further includes a crosspiece 37 extending through the pair of spaced apart slots 36 and terminating at a pair of downward depending vertical legs 38 thereby assuming an inverted U-shape. The dedicated collective control servo 32's control rod 33 is rigidly connected to the crosspiece 37. The rotor head 20B includes a pair of rockers 39 each having a rocker inner end 41 adjacent the mast 21, a rocker center 42 and a rocker outer end 43 remote from the mast 21. Each rocker inner end 41 includes a ball joint 44 connected to an vertical leg 38. Each rocker center 42 is rotatably connected to a horn 31 rigidly connected to a rotor blade 22. Each rocker outer end 43 includes a ball joint 46 connected to a push rod 28.

Section 2: Dual Collective Rotor Heads (DCRHs)

The Dual Collective Rotor Heads (DCRHs) of the present invention are similar in construction to the conventional rotor heads and therefore similar parts are likewise numbered. The DCRHs of the present invention include a dedicated collective control servo 32 with a control rod 33 for collective control of the rotor blades 22 independent of their servo arrangement 24.

Figure 8:
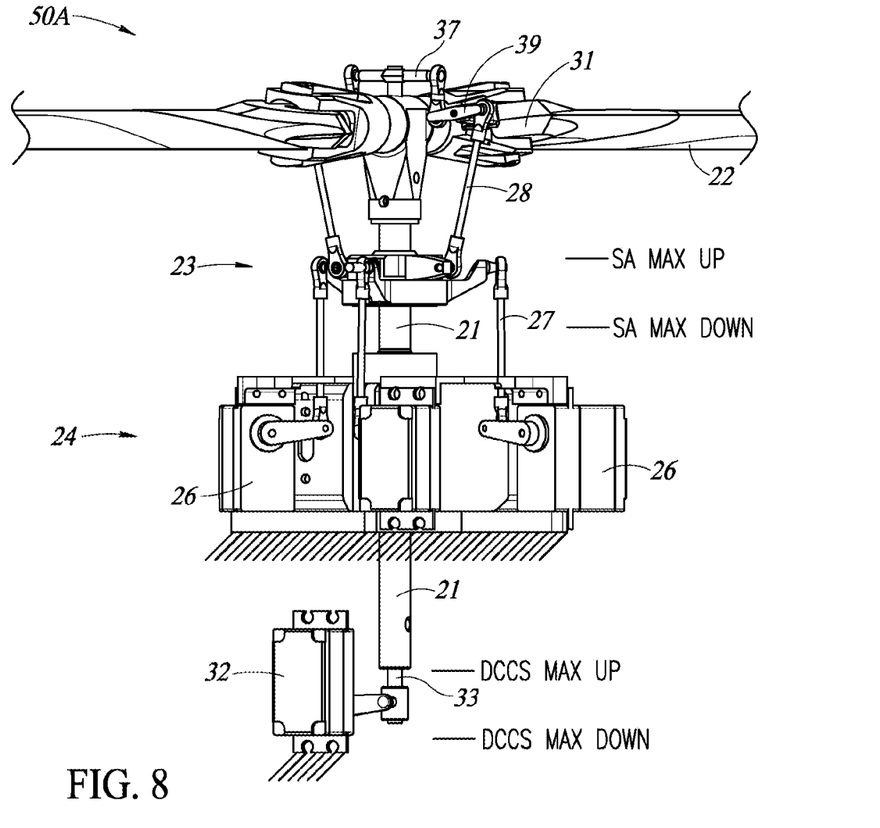
FIG. 8 is a side view of one embodiment of a dual collective rotor head with its servo arrangement and its dedicated collective control servo in their mid-position.
Figure 9:
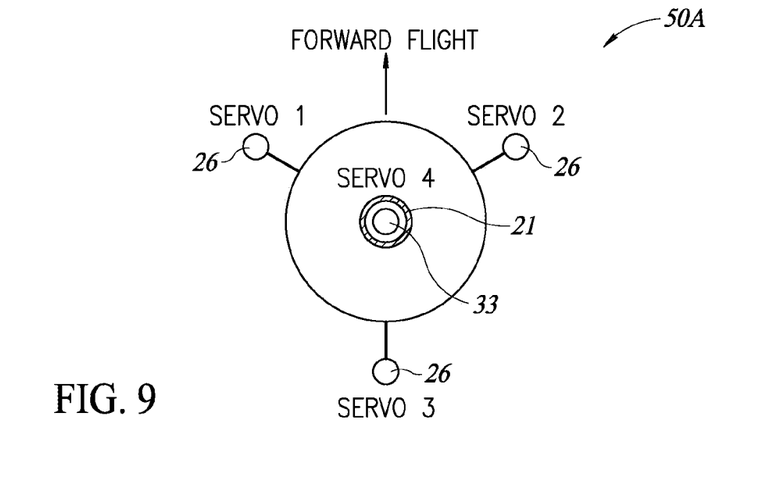
FIG. 9 is a schematic representation of the FIG. 8 dual collective rotor head.
Figure 10:
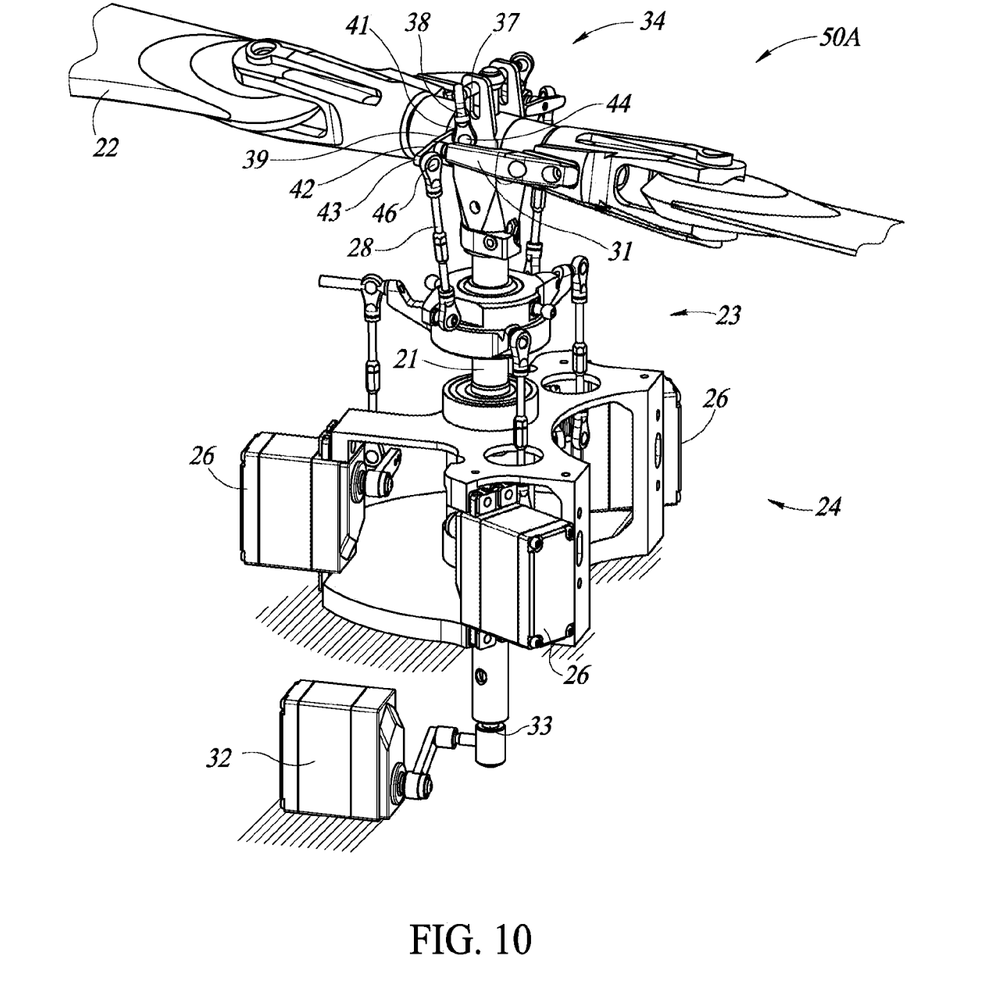
FIG. 10 is a pictorial view of the FIG. 8 dual collective rotor head with its servo arrangement in its mid position and its dedicated collective control servo in its maximal up position.

FIG. 8 to FIG. 10 show a DCRH 50A similar to the rotor head 20A insofar as it includes a swashplate mechanism 23 rotatably mounted on a mast 21 and displaceable therealong. The DCRH 50A includes a stationary servo arrangement 24 having three servos 26 denoted Servo 1, Servo and Servo 3 for actuating the swashplate mechanism 23 with upwardly extending push rods 28 for collective control and cyclic control of its rotor blades 22. The servo arrangement 24 displaces the swashplate mechanism 23 between a SA MAX UP position for maximum collective and a SA MAX DOWN position for minimum collective.

The DCRH 50A is additionally similar to the rotor head 20B insofar as it includes a hollow mast 21 and a dedicated collective control servo 32 denoted Servo 4 for longitudinally displacing a control rod 33 upwardly extending through the hollow mast 21 for collective control of the rotor blades 22 independent of the stationary servo arrangement 24. Accordingly, the DCRH 50A includes a bifurcated masthead 34 with spaced apart slots 36, a crosspiece 37 with a pair of downward depending vertical legs 38, and a pair of rockers 39 connected to the push rods 28, the horns 31 and the vertical legs 38. The dedicated collective control servo 32 has a DCCS MAX UP position for maximum collective and a DCCS MAX DOWN position for minimum collective.

FIG. 8 shows the DCRH 50A with its servo arrangement 24 and its dedicated collective control servo 32 denoted Servo 4 in their mid-position while FIG. 10 shows the DCRH 50A with its servo arrangement 24 in its mid position and its dedicated collective control servo 32 denoted Servo 4 in its DCCS MAX UP position.

Figure 11:
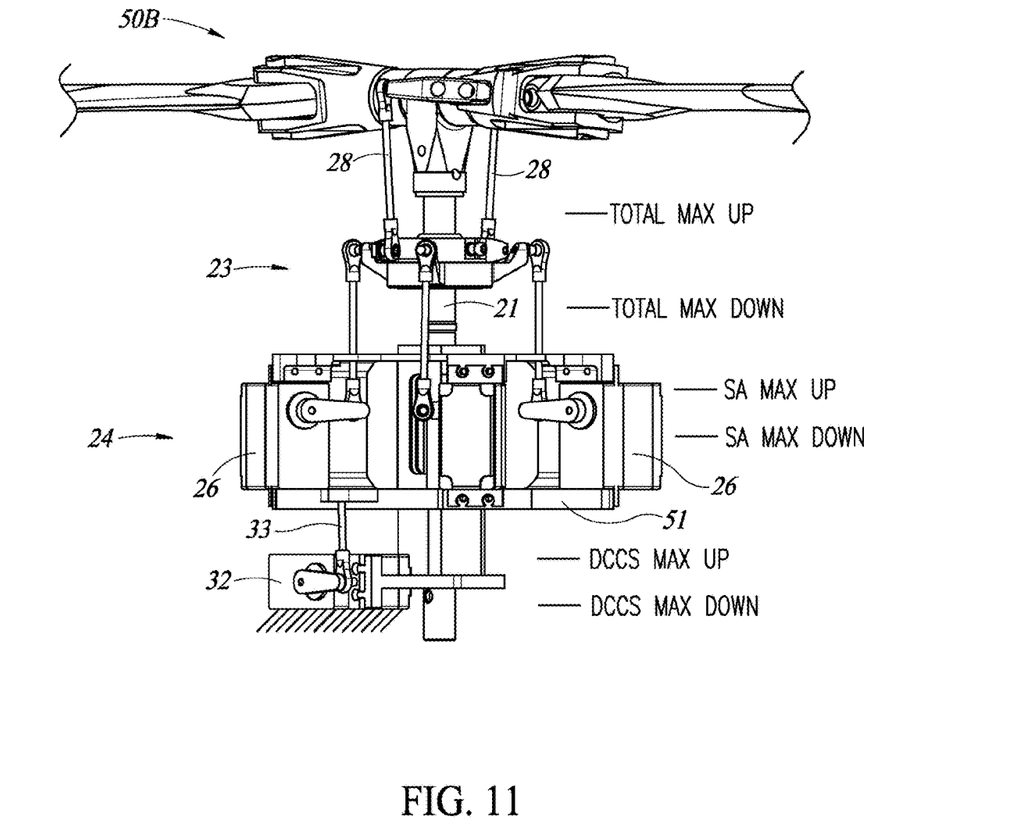
FIG. 11 is a side view of another embodiment of a dual collective rotor head with its servo arrangement and its dedicated collective control servo in their mid-position.
Figure 12:
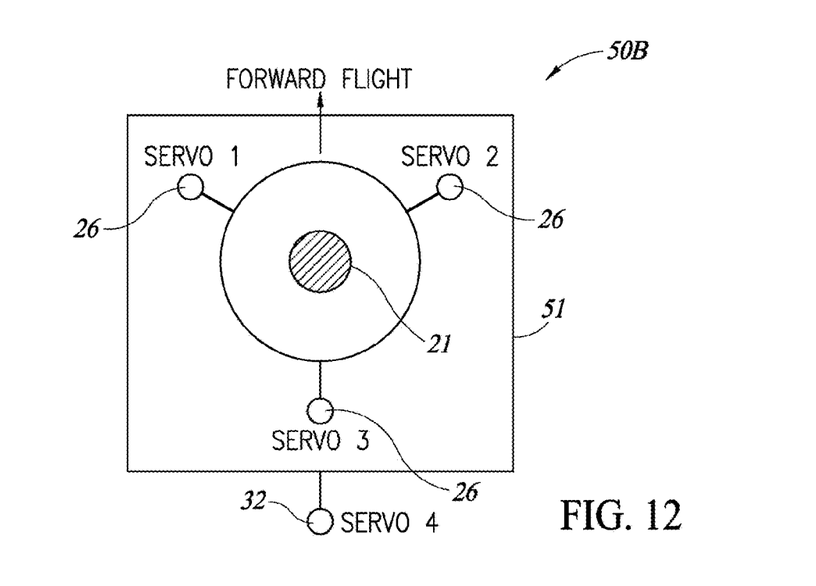
FIG. 12 is a schematic representation of the FIG. 11 dual collective rotor head.
Figure 13:
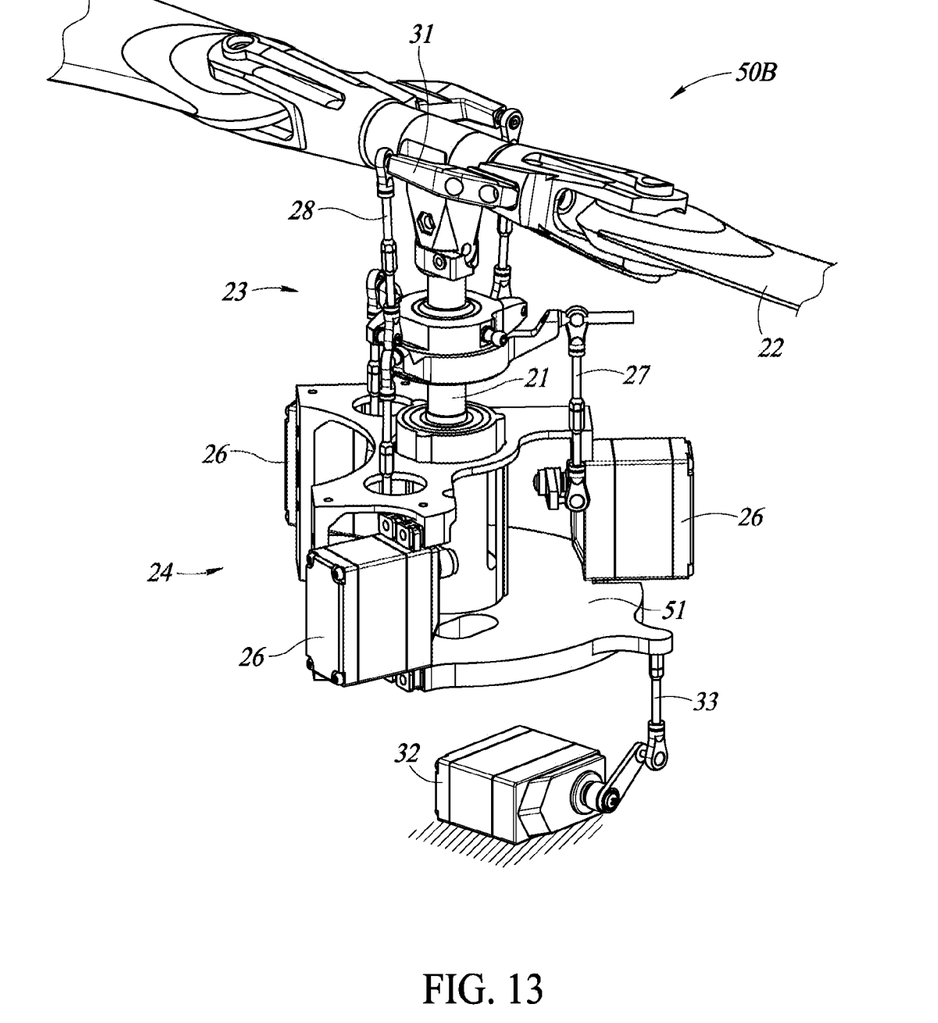
FIG. 13 is a pictorial view of the FIG. 11 dual collective rotor head with its servo arrangement in its mid position and its dedicated collective control servo in its maximal up position.

FIG. 11 to FIG. 13 show a DCRH 50B similar to the rotor head 20A insofar it includes a swashplate mechanism 23 rotatably mounted on a mast 21 and displaceable therealong. The DCRH 50B includes a stationary servo arrangement 24 having three servos 26 denoted Servo 1, Servo and Servo 3 for actuating the swashplate mechanism 23 with upwardly extending push rods 28 for collective control and cyclic control of its rotor blades 22. The servo arrangement 24 displaces the swashplate mechanism 23 between a SA MAX UP position for maximum collective and a SA MAX DOWN position for minimum collective.

The DCRH 50B differs from the rotor head 20A insofar as the servo arrangement 24 is not stationary and includes a platform 51 for supporting the servo arrangement 24. The DCRH 50B employs its dedicated collective control servo 32 for longitudinally displacing the platform 51 along the mast 21 for collective control of the rotor blades 22 independent of the servo arrangement 24. Such longitudinal displacement inherently leads to similar longitudinal displacement of the supported swashplate mechanism 23 and the servo arrangement 24. The dedicated collective control servo 32 has a DCCS MAX UP position for maximum collective and a DCCS MAX DOWN position for minimum collective.

In an alternative arrangement, a DCRH 50B can employ a dedicated collective control servo 32 to directly longitudinally displace a servo arrangement 24 and therefore a swashplate mechanism 23 along a mast 21.

FIG. 11 shows a TOTAL MAX UP position for maximum collective on commanding the servo arrangement 24 to its SA MAX UP position and the dedicated collective control servo 32 to its DCCS MAX UP position and a TOTAL MAX DOWN position on commanding the servo arrangement 24 to its SA MAX DOWN position and the dedicated collective control servo 32 to its DCCS MAX DOWN position.

FIG. 11 shows the DCRH 50B with its servo arrangement 24 and its dedicated collective control servo 32 denoted Servo 4 in their mid-position while FIG. 13 shows the DCRH 50B with its servo arrangement 24 in its mid position and its dedicated collective control servo 32 denoted Servo 4 in its DCCS MAX UP position.

Section 3: Dual Collective Rotor Head Operation and Failure Workaround

Figure 14:
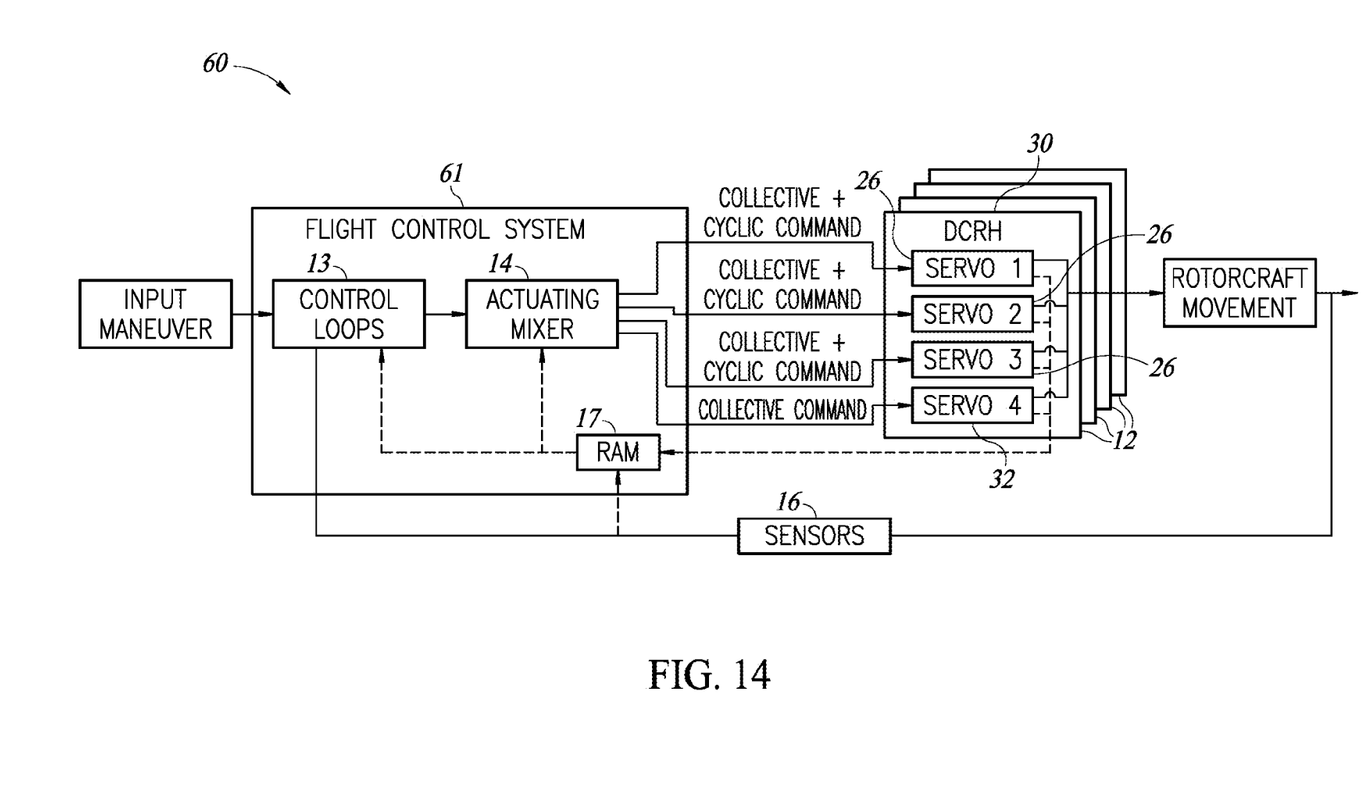
FIG. 14 is a block diagram of a rotorcraft including one or more dual collective rotor heads.
Figure 15:
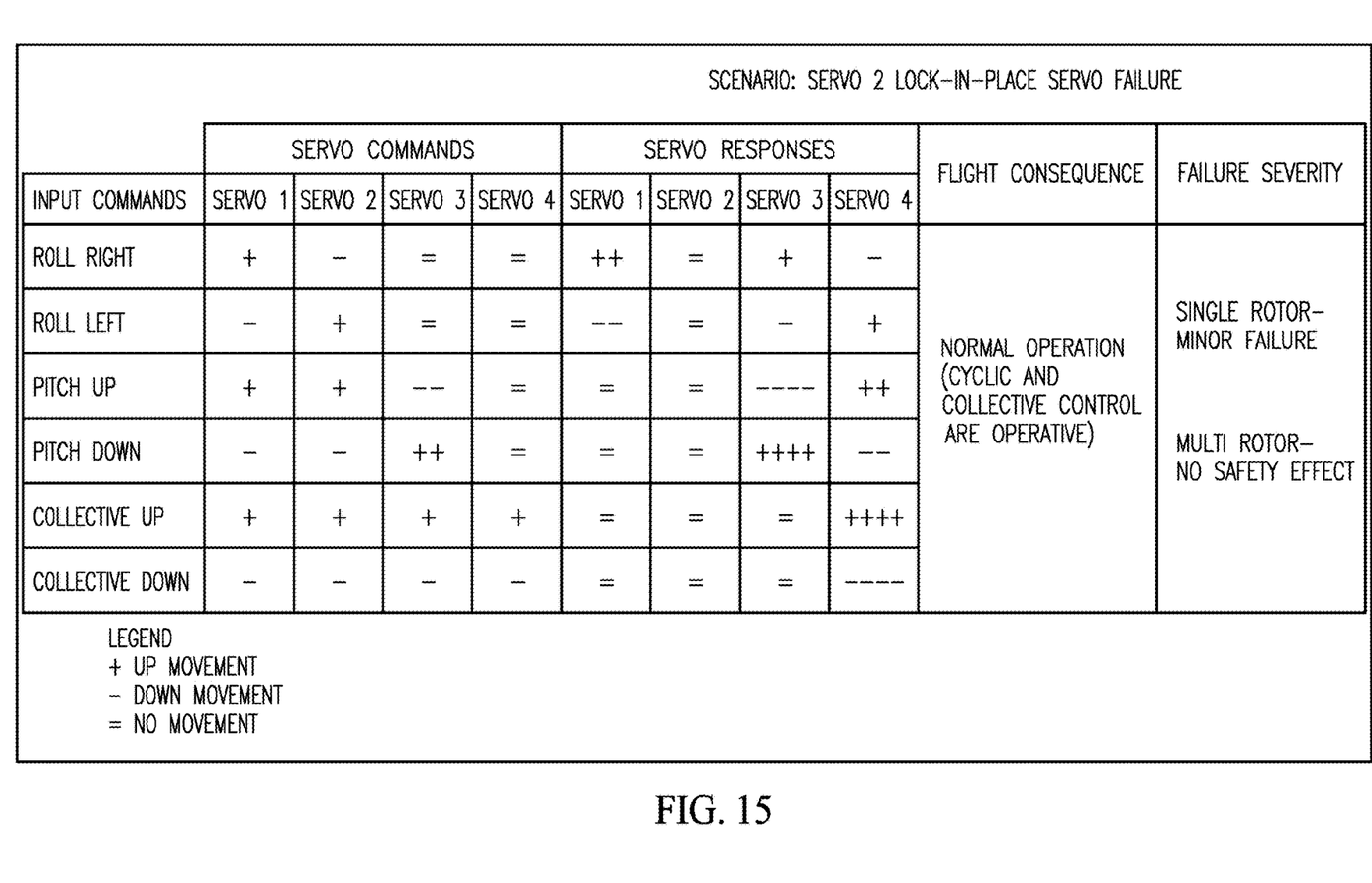
FIG. 15 is a table showing standard operation of a dual collective rotor head and its servo responses on an occurrence of a Servo 2 "lock-in-place" servo failure.
Figure 16:
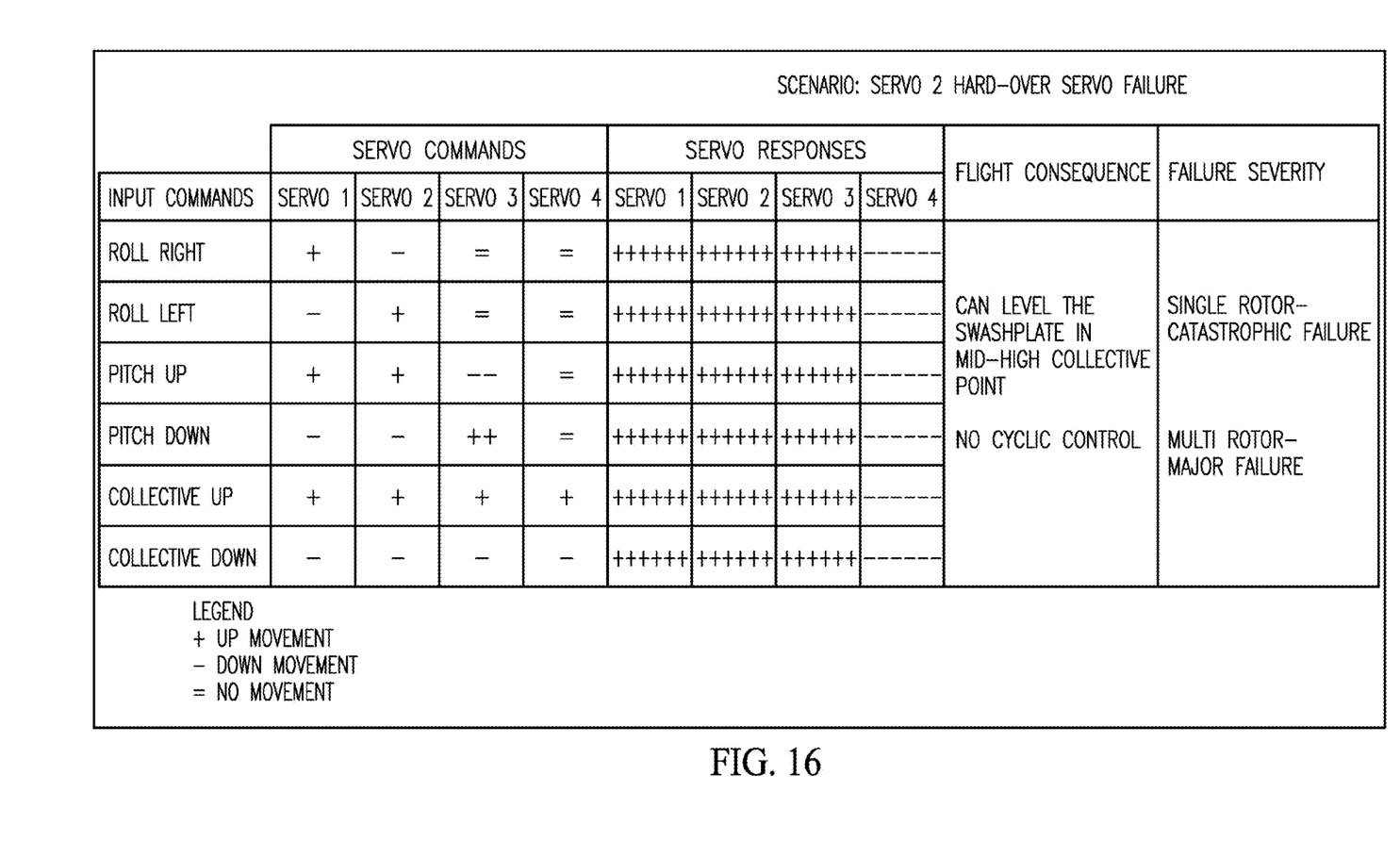
FIG. 16 is a table showing standard operation of dual collective rotor head and its servo responses on an occurrence of a Servo 2 "hard-over" servo failure.

With reference to FIG. 14 to FIG. 16, a rotorcraft 60 is similar in construction to the rotorcraft 10 and therefore similar parts are likewise numbered. The rotorcraft 60 differs from the rotorcraft 10 insofar as the rotorcraft 60 includes one or more rotor systems 12 each having a DCRH 50 and a Flight Control System (FCS) 61 configured for commanding cyclic control and collective control of each DCRH 50. In the case of a multi-rotor rotorcraft, the FCS 61 can provide the same or different cyclic commands and collective commands to its rotor systems 12 depending on the number of rotor systems and an input maneuver. The FCS 61 can optionally include a RAM 17 similar to the FCS 11 and additionally may receiving input signals from sensors 16, the servos 26 and the dedicated collective control servos 32. The FCS 61 is pre-set for dividing collective control of each DCRH 50 between its servo arrangement 24 and its dedicated collective control servo 32 at a ratio between 100%/0% respectively, and 0%/100%, respectively.

FIG. 15 shows standard operation of a DCRH 50 for cyclic control and collective control of its rotor blades 22 for an exemplary pre-set 50%/50% collective control division between its servo arrangement 24 and its dedicated collective control servo 32 for six input commands: Roll right, Roll Left, Pitch Up, Pitch Down, Collective Up and Collective Down. FIG. 15 also shows a DCRH 50's servo response on an occurrence of a Servo 2 "lock in place" servo failure for the standard six input commands: Roll Right, Roll Left, Pitch Up, Pitch Down, Collective Up and Collective Down. Provision of the dedicated collective control servo 32 facilitates normal cyclic control and collective control notwithstanding the Servo 2 "lock in place" servo failure for both a single rotor rotorcraft and a multi-rotor rotorcraft, for example, a quadcopter. Accordingly, in the former, a Servo 2 "lock-in-place" servo failure is a minor failure compared to FIG. 4's catastrophic failure. In the latter, a Servo 2 "lock-in-place" servo failure has no safety effect compared to FIG. 4's hazardous failure.

FIG. 16 shows standard operation of a DCRH 50 for cyclic control and collective control of its rotor blades 22 for an exemplary pre-set 50%/50% collective control division between its servo arrangement 24 and its dedicated collective control servo 32 for six input commands: Roll right, Roll Left, Pitch Up, Pitch Down, Collective Up and Collective Down. FIG. 16 also shows a DCRH 50's servo response on an occurrence of a Servo 2 "hard-over" servo failure for the standard six input commands: Roll Right, Roll Left, Pitch Up, Pitch Down, Collective Up and Collective Down. Provision of the dedicated collective control servo 32 facilitates enabling positioning a swashplate mechanism at a mid-high collective point and no cyclic control for both a single rotor rotorcraft and a multi-rotor rotorcraft, for example, a quadcopter. Accordingly, in the former, a Servo 2 "hard-over" servo failure is a catastrophic failure the same as FIG. 5's catastrophic failure. In the latter, a Servo 2 "hard-over" servo failure is a major failure compared to FIG. 5's hazardous failure.

While particular embodiments of the present invention are illustrated and described, it would be obvious to those skilled in the art that various other changes and modifications can be made without departing from the scope of the invention.

The invention claimed is:

1. A dual collective rotor head configured for attachment of at least two rotor blades thereto, the dual collective rotor head comprising:
   (a) a mast for rotating the at least two rotor blades;
   (b) a swashplate mechanism displaceable along said mast for cyclic control and collective control of the at least two rotor blades;
   (c) a servo arrangement of at least three servos for actuating said swashplate mechanism; and
   (d) a dedicated collective control servo for only collective control of the at least two rotor blades independent of said servo arrangement.

2. The dual collective rotor head according to claim 1 wherein said mast is a hollow mast and further comprising a control rod longitudinally accommodated within said hollow mast, and wherein said dedicated collective control servo longitudinally displaces said control rod within said hollow mast for said collective control of the at least two rotor blades.

3. The dual collective rotor head according to claim 1 wherein said dedicated collective control servo longitudinally displaces said servo arrangement along said mast for said collective control of the at least two rotor blades.

4. The dual collective rotor head according to claim 3 and further comprising a platform for supporting said servo arrangement and said dedicated collective control servo longitudinally displaces said platform along said mast for displacing said servo arrangement therealong.

5. A flight control system configured for controlling the servo arrangement and the dedicated collective control servo of a dual collective rotor head according to claim 1 wherein the flight control system is pre-set to divide collective control of its at least two rotor blades between a 100% servo arrangement/0% dedicated collective control servo ratio and a 0% servo arrangement/100% dedicated collective control servo ratio.

6. The flight control system according to claim 5 wherein the flight control system commands said servo arrangement and said dedicated collective control servo for combined collective control of the at least two rotor blades for overcoming a servo failure in said servo arrangement.

7. The flight control system according to claim 6 wherein said servo failure is a lock-in-place failure.

8. The flight control system according to claim 6 wherein said servo failure is a hard-over failure.

9. A computer readable storage medium comprising instructions for execution in a flight control system pre-set to divide collective control of a dual collective rotor head's at least two rotor blades according to claim 1 between a 100% servo arrangement/0% dedicated collective control servo ratio and a 0% servo arrangement/100% dedicated collective control servo ratio and command its servo arrangement and its dedicated collective control servo for combined collective control of its at least two rotor blades for overcoming a servo failure in its servo arrangement.

10. A rotorcraft comprising:
   (a) a fuselage;
   (b) at least one dual collective rotor head according to claim 1 mounted on said fuselage; and
   (c) a flight control system pre-set to divide collective control of the at least one dual collective rotor head's at least two rotor blades between a 100% servo arrangement/0% dedicated collective control servo ratio and a 0% servo arrangement/100% dedicated collective control servo ratio, and command its servo arrangement and its dedicated collective control servo for combined collective control of its at least two rotor blades for overcoming a servo failure in its servo arrangement.

11. A method of operating a rotorcraft including a fuselage, at least one dual collective rotor head according to claim 1 mounted on said fuselage, and a flight control system for controlling said at least one dual collective rotor head, the method of operation comprising the steps of:
  a) pre-setting the flight control system to divide collective control of the at least one dual collective rotor head's at least two rotor blades between a 100% servo arrangement/0% dedicated collective control servo ratio and a 0% servo arrangement/100% dedicated collective control servo ratio, and
  b) commanding its servo arrangement and its dedicated collective control servo for combined collective control of its at least two rotor blades for overcoming a servo failure in its servo arrangement.

\* \* \* \* \*